Sept. 13, 1938.　　　　L. NEUMANN　　　　2,130,310
LOCOMOTIVE WITH PNEUMATIC TRANSMISSION BY MEANS
OF A MIXTURE OF COMPRESSED AIR AND STEAM
Filed April 23, 1935　　　2 Sheets-Sheet 1
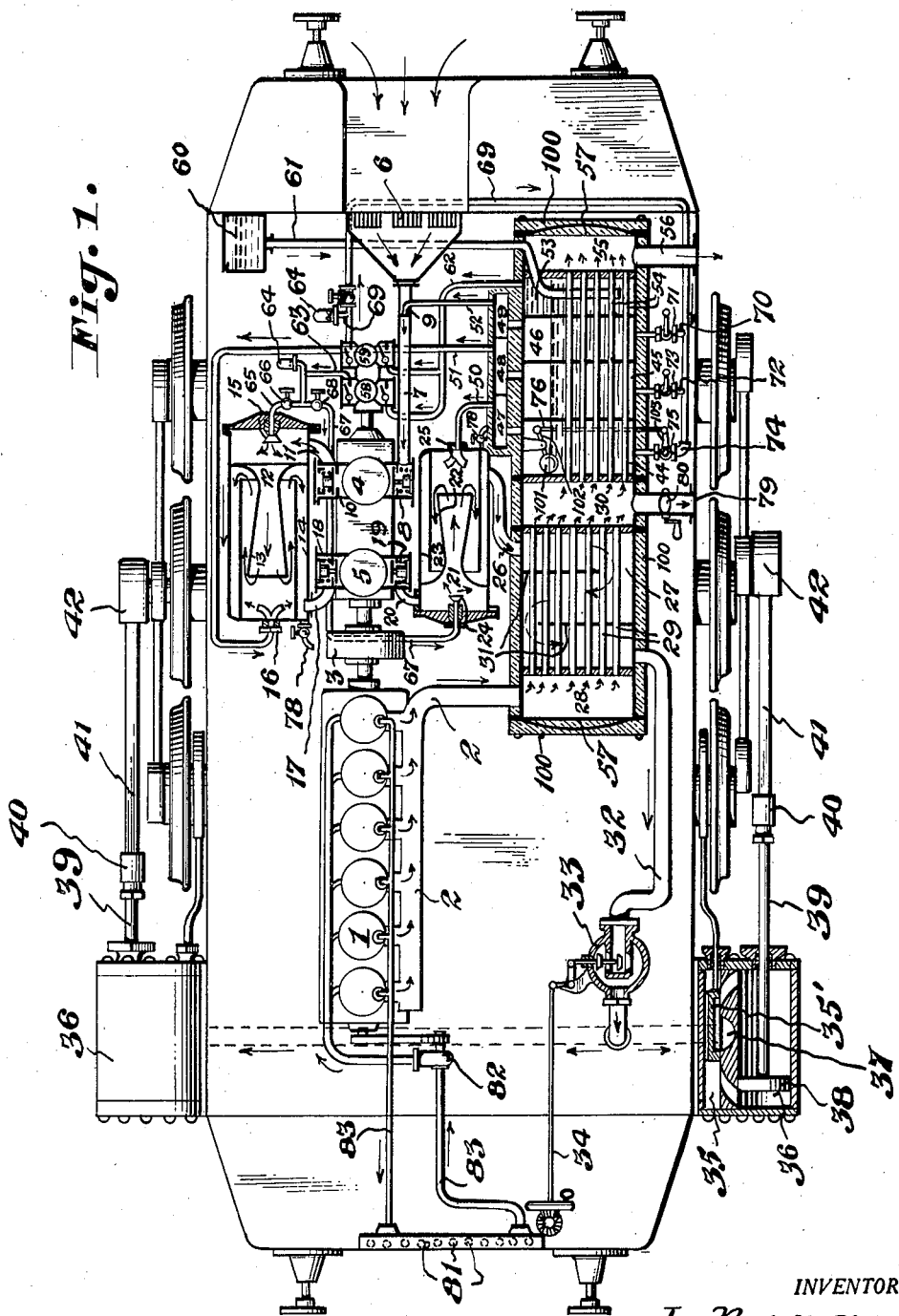
Fig. 1.
INVENTOR:
L. Neumann
ATTORNEYS.

Sept. 13, 1938.  L. NEUMANN  2,130,310
LOCOMOTIVE WITH PNEUMATIC TRANSMISSION BY MEANS
OF A MIXTURE OF COMPRESSED AIR AND STEAM
Filed April 23, 1935  2 Sheets-Sheet 2
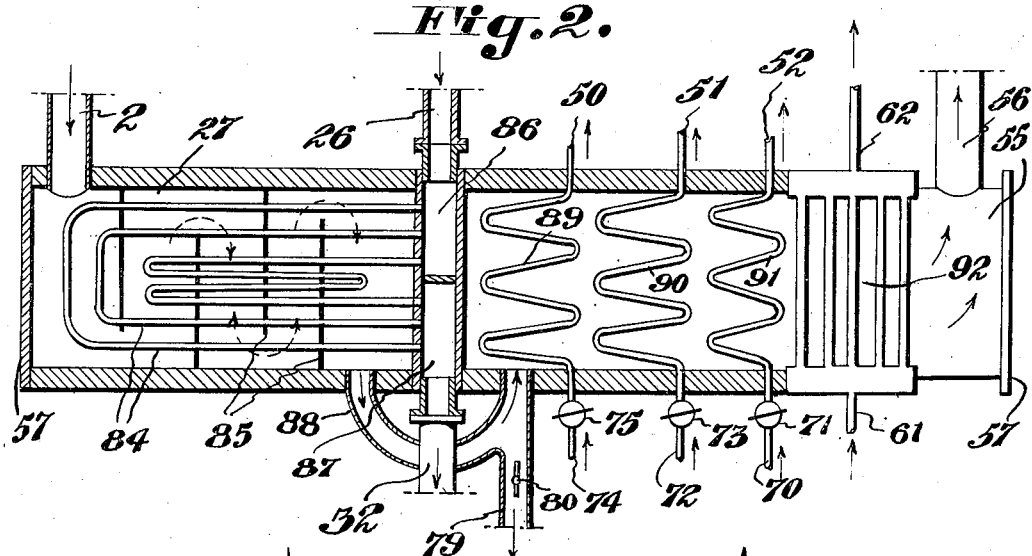
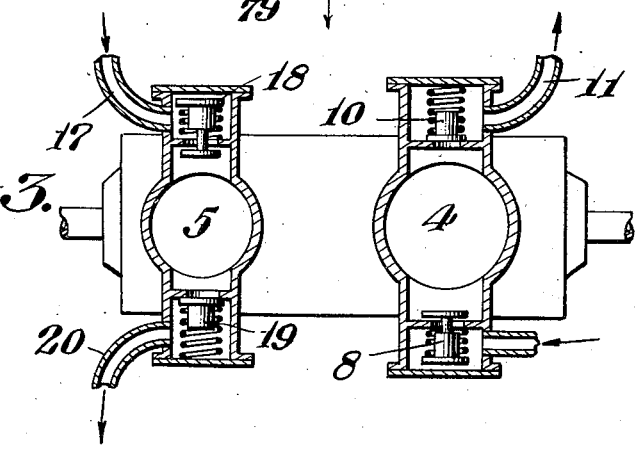
INVENTOR:
L. Neumann
BY
Glascock Downing Seebold
ATTORNEYS.

Patented Sept. 13, 1938

2,130,310

UNITED STATES PATENT OFFICE 2,130,310

LOCOMOTIVE WITH PNEUMATIC TRANSMISSION BY MEANS OF A MIXTURE OF COMPRESED AIR AND STEAM

Luigi Neumann, Milan, Italy, assignor to Società Anonima Brevetti Zarlatti, Rome, Italy Application April 23, 1935, Serial No. 17,840

2 Claims. (Cl. 60—14)

The present invention relates to improvements in the pneumatic transmission of combustion motor power to the driving wheels of a locomotive, the motor being preferably of Diesel type.

The pressures of 15 to 25 atmospheres of the transmission means, as used in locomotive cylinders, require at least two stage compressors. If the direct and simple use of pure compressed air is excluded, it would lead to temperatures below the freezing point at the end of the expansion period in the locomotive cylinders and to the formation of ice from the natural humidity contained in the air.

A strong superheating of the air is an imperfect solution. In fact the surfaces for heat transmission are much too large, the heat of the exhaust gases of the motor is insufficient at reduced loads and finally the higher temperatures of the air make the lubrication difficult and dangerous, due to the formation of an explosive mixture of oil vapors and air.

According to the present application the transmission means is a mixture of compressed air saturated with water vapor. Studies and tests made with experimental locomotives prove that the latent heat of the vapor, condensed during the expansion period in the locomotive cylinders, checks the above mentioned rapid temperature drop of the expanding compressed air. The same experiments prove also that the saturation of the air with vapor must be brought beyond a minimum percentage of 5% and that 5 to 10% of vapor may be obtained by exclusively utilizing the waste heats at disposal in the group motor compressor. The final exhaust temperatures of such a mixture always remain sensible above the freezing point, near 40° C., notwithstanding the high ratios of expansion of 1:15 to 1:25, according to the above named initial pressure of the transmission means, the initial temperatures of the mixture remaining within tolerable limits, 200° to 250° C.

Fig. 1 is a top plan view partly in section of the whole of the transmission arranged on a locomotive.

Fig. 2 is a sectional detail of a modification of the fittings used for the utilization of the exhaust gases of the motor.

Figure 3 is an enlarged view of the two-stage compressor illustrating in greater detail the inlet and exhaust valves thereof.

In Fig. 1 of the accompanying drawings the combustion motor shown with six cylinders is marked with reference number 1. The cooling cycle of the motor is represented by piping 83 with circulating pump 82 and radiators 81 therein inserted. The exhaust tube of the motor is marked with 2. The motor is directly connected by means of a flywheel-coupling 3 to the compressor shown as a double stage compressor.

The low pressure cylinder is marked 4, the high pressure one 5. The outside air is sucked by the low pressure cylinder 4 through the air filter 6, inlet conduit 7 and inlet valve 8. In the inlet conduit 7 there is arranged a distributing injector of steam 9 saturating the outside air by adding a first quantity of steam produced by the vaporizing system described further on. The compressed air consequently heated in this cylinder (the compressor is of the high-speed type, the compression being then near the adiabatic one) is delivered through the valve 10 and conduit 11 into the low-pressure saturator 12. This saturator consists of a preferably cylindrical receptacle whose inside walls 13 and 14 cause the air to flow through a multiple passage. On entering the saturator the compressed air receives an injection of finely atomized water under high pressure through the atomizer (or group of atomizers) 15. The first wall 13 is, as illustrated, preferably of a double conical shape with the object of obtaining with the variation of the current speed a more homogeneous mixture and a quicker vaporization of the water particles injected in such a regulated quantity as to obtain a complete vaporization. In the conical shaped part the speed increases in correspondence to the reduction of the section. Thus the relative speed between the air and the water particles injected increases. The molecular contact is more active, the vaporization being thus favored. The vaporization increases, on one side, the saturation and on the other side produces the intermediary cooling of the compressed air by subtracting therefrom the heat required for the vaporization. The saturation is furthermore increased by adding to the air, in an intermediary part of the saturator, a convenient quantity of steam admitted through the distributing injector of steam 16.

The low pressure mixture, when cooled and saturated as specified, is sucked by the high pressure cylinder 5 of the compressor through the conduit 17 and sucking valve 18 and is compressed (in the case illustrated of a double stage compressor) at the final pressure and is heated again. The compressed mixture flows out of the high pressure cylinder through the valve 19 and conduit 20 into the high pressure saturator 21, similarly constructed as the low pressure one, but of proportionately reduced dimensions. Also in this saturator the inside walls 22 and 23 cause the air to flow through a multiple passage, thus ensuring the perfect vaporization of the atomized water injected under high pressure through the atomizer (or group of atomizers) 24. A homogeneous mixture is thus obtained the saturation of which is still increased by the addition of a fresh quantity of steam through the distributing injector of steam 25.

The mixture of compressed air has at the outlet of the high pressure saturator 21 a relatively reduced temperature (nearly 120° to 140° C.) after the vaporization of the water injected. The mixture however is highly saturated with steam, owing to the various direct additions of steam and to the vaporization of the water injected into the low and high pressure saturators.

From the high pressure saturator 21 the mixture formed as above specified is admitted through the conduit 26 into the heater 27 where the temperature of the mixture is brought to the level wanted, that is, as already specified, between 200° and 250° by means of the heat contained in the exhaust gases of the combustion motor. This heater is according to the modification of the invention illustrated in Fig. 1 a receptacle with two collecting chambers provided at its both ends. Into the fore chamber 28 enters directly the exhaust pipe 2 of motor 1 and the exhaust flows into the other back chamber 30 through a cluster of tubes 29 externally swept by the mixture to be heated. In order to obtain a multiple passage of the mixture transversely of the cluster of tubes with greater speeds and a better heat transmission there are arranged inside the heater the baffle plates 31.

The mixture saturated and heated flows out of the heater 27 through the tube 32, passes through the regulator valve 33 controlled as in steam locomotives from the driver's cab by means of a regulator rod 34 and enters the valve chest or casing 35 of the cylinders 36 of the locomotive. The distribution of the mixture is effected within the cylinders 36 by means of slide valves 35'. After expanding in the cylinders of the locomotive the mixture is expelled into the atmosphere through the exhaust pipe (not shown) connected to the casing 35.

The work developed is transmitted, as usually, by the cylinder of the locomotive through the piston 38, the rod 39, crosshead 40 and connecting rod 41 to the driving axle 42.

The steam added to the compressed air, in the parts specified of the system by means of the distributing injectors 9, 16 and 25 is produced in a generating apparatus with three subdivisions or chambers 44—45—46 traversed by a cluster of tubes 54 of the motor's exhaust gases coming from the back collecting chamber 30 of the heater 27.

In the arrangement illustrated the exhaust gases are progressively yielding heat to the water to be vaporized. Their temperature is therefore also progressively lowered during their passage through the generating body and also the temperatures and pressures of the steam to be produced is lowered in the three generating chambers. In fact, the gases entering the tubes of the chamber 44 have a temperature relatively high and sufficient to produce steam of a corresponding pressure.

This pressure corresponds to that of the high pressure saturator 21. The lowered temperature of the gases passing through the tubes in the chamber 45 produces steam of lower pressure, corresponding to the pressure in the low pressure saturator 12. Finally, the gases entering the tubes of the chamber 46 have a temperature still lower but sufficient to produce steam of 1 atm. 100° C. which can be added to the fresh air sucked by the compressor.

In fact, the gases, as soon as they flow from the heater 27 are admitted into subdivision 44 and are still capable of producing steam under high pressure, which collected in a chamber 47 runs through the tube 50 into the distributing injector 25 of the high pressure saturator. The steam produced in the middle subsequent subdivision or chamber 45 at already more reduced temperature and pressure is on the contrary gathered in the collector 48 and led through the tube 51 to the distributing injector 16 of the low pressure saturator. Finally the steam generated in the last subdivision or chamber 46 is gathered in a collector 49, flowing then through the tube 52 to the distributing injector 9 arranged in the inlet tube 7 of the compressor and serving for moistening the inlet air.

The exhaust gases after flowing through the heating body of the mixture 27 and the generating subdivisions or chambers 44, 45 and 46 are finally utilized in the pre-heater 53 of the water serving as well for feeding the heat generating subdivisions or chambers as for feeding the atomizers 15 and 24 of the low and high pressure saturators.

The gases after yielding progressively their heat in the heater, vaporizing and pre-heating subdivisions are gathered in the collecting chamber 55 and then expelled into the atmosphere through the exhaust tube 56. The collecting chambers 28 and 55 are preferably provided with removable covers 57 in order to allow an easy supervision and the cleaning of the clusters of pipes 29 and 54.

In Fig. 1 the heat recovering apparatuses of the exhaust gases are shown in a single self-contained construction with outside insulating lining 100 and an intermediary collecting chamber 30 for the gases so that it is easier to separate the subdivisions or chambers of the mixture under pressure from those for steam production. Also the steam collectors 47, 48 and 49 are illustrated in a single self-contained construction; the due order in the passage of the gases through the various constituent elements being always preserved.

The water feeding of the sprayers of the saturators and steam generators is provided for by the pumps 58 and 59 directly controlled by the shaft of the motor-compressor group. The number of revolutions of the pumps varies consequently with the number of revolutions of the compressor, a determined proportion being in this way kept between the quantity of compressed air and the steam added thereto.

The water flows from the water tank 60 through the tube 61 to the pre-heater 53 and from this through the inlet tube 62 into the two pumps. The pump 58 sends the water under high pressure through piping 63, provided with a safety valve 64, and then through the branch pipes 65 and 67 to the sprayers (or groups of sprayers) 15 and 24. In the pipings there are inserted the valves 66 and 68 for governing the flow of water.

The pump 59, on the contrary, sends the water through the tubing 69 (with another safety valve 64) and the branch pipes 70—72—74 to the additional steam producing apparatuses. In these branch pipes there are arranged the regulating valves 71—73—75 controlled by hand or automatically depending on the water level in the generating subdivisions or chambers as schematically shown by 76 in subdivision 44. The drain cocks 78 provided in the saturators 12 and 21 serve for the discharge of the excess water contained in these apparatuses.

From above description it clearly results that the saturation of the compressed air is completely effected outside the compressor, any injection whatever being thus avoided. The construction of the compressor preserves consequently the greatest simplicity, this characteristic properly belonging to the machines of this kind and being particularly important in traction machines. In this way the safety of working and a better efficiency are also warranted.

The low and high pressure saturators are also utilized as storage tanks for the mixture these elements being equally useful in railway traction with the continuous variations of the moving load.

The collecting chamber 30 of the exhaust gases (after their flowing through the heater 27) is provided with an auxiliary exhaust pipe 79, adjustable by means of the throttle valve 80.

This permits variation of the quantity of gas flowing through the steam generating system and pre-heater, a further element of adjustment in steam production being thus acquired.

As shown in Fig. 2 the heater 27 may be also constructed in such a way that the mixture to be heated circulates in the tubular system 84 while the exhaust gases arriving through the exhaust tube 2 pass externally along the tubes. The diaphragms 85 serve in this case to cause the gas to adopt a winding flowing transversely to the tubular system, which may preferably consist of U-shaped tubes (or coil-tubes) as used in the superheaters of steam locomotives. The mixture arrives through the tube 26 of the high pressure saturator (Fig. 1, reference number 21) in chamber 86, flows through the tubular system 84 and after being collected again in chamber 87 of the collector flows off through the tube 32 towards the regulator (Fig. 1, reference number 33).

The exhaust gases flow then through the conduit 88 to the steam generating systems and to the pre-heater, constructed as alternately illustrated in Fig. 2 with coil tubes 89, 90 and 91 run through by the water to be vaporized, the exhaust gases playing externally upon them. The tubular systems 89—90—91—92 consequently constitute the vaporizing chambers 44—45—46 and the pre-heater 53 of Fig. 1.

The inlet and outlet tubes 70—72—74 and 50—51—52 have the same object as illustrated in Fig. 1 that is feeding of vaporizing and preheating groups and connection with the corresponding steam distributing injectors.

The problem of the intermediary cooling of the compressor is solved by embodying it in the system of saturation. The mixture is not only freed of the serious inconveniences inherent to the use of pure compressed air, but also serves for improving the efficiency of the system, a part of the waste energy being transformed into useful work by means of the steam produced and utilized together with the compressed air. The recovering of waste heat is absolutely complete owing to the systematic progressive use of them in the various elements serving for the saturation.

In a locomotive constructed according to the present invention the group comprising motor compressor and pumps is preferably arranged longitudinally on the frame, while the saturators, heater and steam generating system and pre-heater constructed as rather long bodies, are arranged on the side of the central group. The saturators with vertical or horizontal axis (in the case of horizontal axis they are preferably superposed) may be also arranged according to the axis of the locomotive in combination of the central group, near the compressor.

Having now particularly described and ascertained the nature of my said invention and in what manner the same is to be performed, I declare that what I claim is:

1. In a locomotive with a combustion motor the pneumatic transmission of the energy by means of a mixture of compressed air and water vapour with the generation of this mixture comprising a combustion motor with variable speed, a double stage compressor directly coupled with the motor and including a low pressure cylinder and a high pressure cylinder, a low pressure saturator after the low pressure cylinder and a high pressure saturator after the high pressure cylinder of the compressor, water sprayers in said saturators serving for the intermediary cooling of the compressed air and for the saturation of the same with water vapor by injecting through said sprayers water under high pressure and in such quantity that the total vaporization is secured; the saturation of the compressed air being furthermore increased by adding in the saturators also a conveniently dosed quantity of steam separately generated; a tubular heater serving for heating the saturated mixture after the high pressure saturator by means of the exhaust gases of the combustion motor; a tubular system for steam generation to be added successively to the compressed air, also functioning with the exhaust gases and having also a tubular pre-heater of the feeding water inserted in the passage of the gas, after the steam generating system; water pumps driven by the shaft of the motor compressor group serving for feeding the sprayers of the saturators and steam generating system, complete connecting tubing for the mixture between the low pressure cylinder of the compressor and the low pressure saturator between this latter and the high pressure cylinder of the compressor, between the high pressure cylinder and the high pressure saturator, between the high pressure saturator and the mixture heater and finally between the heater and the locomotive cylinders with a main regulator before these cylinders, in order to control the inlet of the compressed mixture to the locomotive cylinders, from which, by means of the connecting rods and the usual crank mechanism, the useful work is transmitted to the driving wheels.

2. In a locomotive with a combustion motor the pneumatic transmission of energy by means of a mixture of compressed air and steam with the generation of said mixture as set forth in claim 1, characterized in that the steam generating system and the pre-heater comprise a system of multiple subdivisions including a cluster of tubes through which pass the exhaust gases of the combustion motor, each vaporizing subdivision producing the water vapour under a pressure progressively reduced but corresponding to the various stages in which the steam is added as specified in the production of the mixture, each subdivision being provided with means for regulating the quantity of feeding water.

LUIGI NEUMANN.